United States Patent [19]
Coleman

[11] Patent Number: 5,438,361
[45] Date of Patent: Aug. 1, 1995

[54] ELECTRONIC GIMBAL SYSTEM FOR ELECTRONICALLY ALIGNING VIDEO FRAMES FROM A VIDEO SENSOR SUBJECT TO DISTURBANCES

[75] Inventor: Guy B. Coleman, Northridge, Calif.
[73] Assignee: Hughes Aircraft Company, Los Angeles, Calif.
[21] Appl. No.: 867,653
[22] Filed: Apr. 13, 1992
[51] Int. Cl.⁶ .................................... H04N 5/228
[52] U.S. Cl. ............................ 348/208; 348/208
[58] Field of Search ............. 358/222, 209, 105, 166; 354/70; 359/554, 555, 556, 557; 382/54; H04N 5/225, 5/228; 348/208, 207, 152, 155, 699, 700

[56] References Cited

U.S. PATENT DOCUMENTS

| | | | |
|---|---|---|---|
| 4,612,575 | 9/1986 | Ishman et al. | 358/160 |
| 4,717,958 | 1/1988 | Gal et al. | 358/222 |
| 4,837,632 | 6/1989 | Kubo et al. | 358/222 |
| 5,012,347 | 4/1991 | Fournier | 348/208 |
| 5,020,890 | 6/1991 | Oshima et al. | 358/222 |
| 5,172,150 | 12/1992 | Teramoto et al. | 354/202 |

FOREIGN PATENT DOCUMENTS

| | | | |
|---|---|---|---|
| 0389192 | 9/1990 | European Pat. Off. | H04N 5/225 |
| 0481230 | 4/1992 | European Pat. Off. | H04N 5/232 |
| 2116397 | 9/1983 | United Kingdom | H04N 5/14 |

OTHER PUBLICATIONS

Oshima, C. M., et al. "VHS Camcorder with Electronic Image Stabilizer", IEEE Transactions on Consumer Electronics, Nov. 1989, vol. 35, No. 4, pp. 749–758. See Particularly Sections 3,4,5 and 6; pp. 750–755.

Primary Examiner—Michael T. Razavi
Assistant Examiner—Twan V. Ho
Attorney, Agent, or Firm—Charles D. Brown; Randall M. Heald; Wanda K. Denson-Low

[57] ABSTRACT

This invention is directed to an electronic gimbal system (10) which stabilizes a digital video image of a particular scene taken by a sensor which is under disturbance forces. The video image is stored as a two-dimensional array of pixel locations (12) and is applied to an address look-up calculator (14) along with a signal from an inertial sensor (16). The inertial sensor (16) determines the offset of the array of pixel locations from an inertial reference frame and adjusts the input array accordingly. In one particular implementation, the address look-up calculator (14) applies a bilinear interpolation to the pixel location in order to provide a weighted sum of pixel intensities for each offset pixel location.

17 Claims, 1 Drawing Sheet

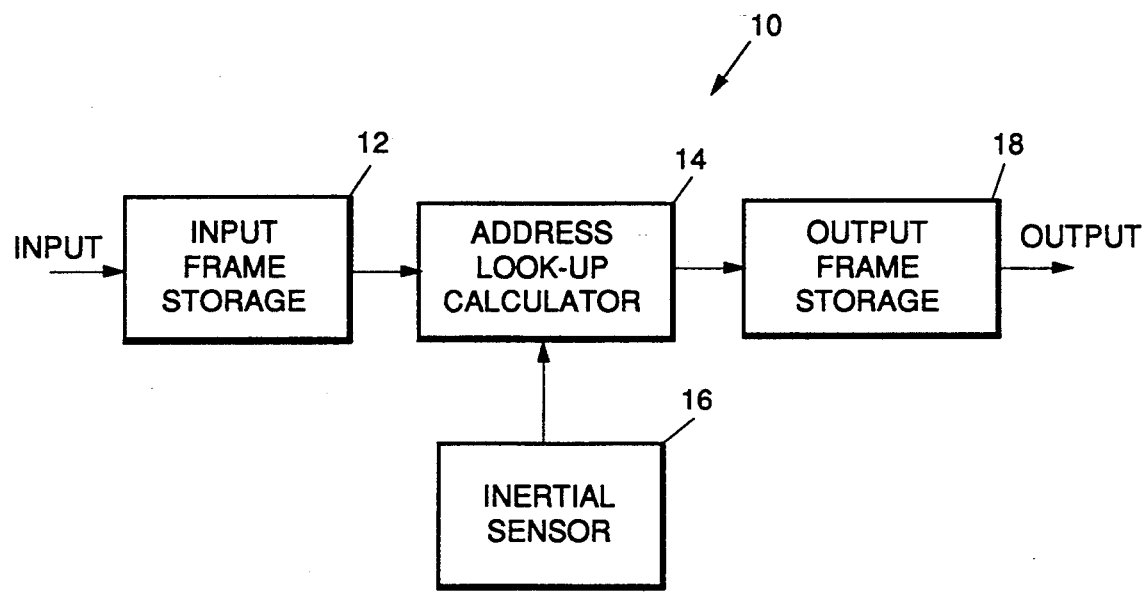
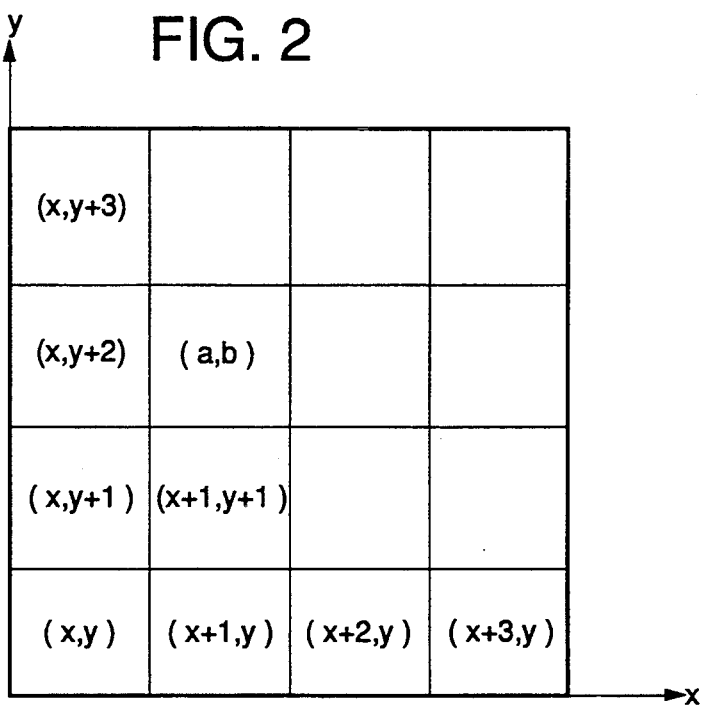
FIG. 1
FIG. 2

ELECTRONIC GIMBAL SYSTEM FOR ELECTRONICALLY ALIGNING VIDEO FRAMES FROM A VIDEO SENSOR SUBJECT TO DISTURBANCES

BACKGROUND OF THE INVENTION

1. Field of the Invention

This invention relates generally to an electronic gimbal system, and, more particularly, to an image stabilization electronic gimbal system for stabilizing an image from an imaging sensor.

2. Discussion of the Related Art

Target seeking imaging systems incorporating an imaging sensor to track a target of interest are known in the art. Inertial image stabilization is generally necessary for imaging sensors which are mounted on moving platforms, such as missiles or aircraft, to permit signal processing of the image data in a stabilized coordinate frame. Because the platform fluctuates due to vibrations caused by turbulence and the like as the missile or aircraft travels through the air, a scene sensed by the sensor as a frame of video data at one time may not be aligned with a consecutive frame of video data, thus causing significant distortion in the image. Therefore, by providing image stabilization the target of interest is more effectively tracked with higher image resolution.

Typically, inertial stabilization has been provided in the past exclusively by mechanical gimbals. A mechanical gimbal is generally comprised of one of a variety of different bearing structures which includes a torquing device for applying a torque to the sensor in a direction opposite to the vibrational disturbance, and thus, enable the sensor pointing direction to remain fixed as the platform vibrates around it. Generally, a separate gimbal is required for each of the roll, yaw and pitch axes in the inertial coordinant frame. As is known, stabilization in the roll direction of the platform is the most complex due to the requirements of slip rings and the like to provide for electrical connections from the sensor to the rest of the seeking system.

In one application, a requirement exists to roll an image for reasons other than inertial stabilization. One such application is in a helmet mounted display for an airborne infrared imaging system. Sensors mounted in an aircraft cockpit sense an operator's head motion such that the infrared imaging sensor is pointed in a direction corresponding to the head movement. Even in these miniaturized versions of imaging systems, a mechanical roll gimbal would ordinarily be required to roll the sensor as the operator's head is rolled from side to side.

As target seeking systems and the like incorporating imaging sensors have become physically smaller and/or have been designed with finer image resolution, the physical requirements on the mechanical gimbal stabilization systems have become much more complex and refined, and thus, more costly to produce. In fact, space requirements of some target seeking systems are beyond the present capabilities of providing a mechanical gimbal in the roll direction. Consequently, there is a need to address this problem.

Electronic image stabilizers have recently been introduced in the art of video cameras. In one particular implementation, a video camcorder has been incorporated with an automatic image stabilization system including a vibration type gyroscope sensor for providing image stabilization. See C. M. Oshima, et al., "VHS Camcorder with Electronic Image Stabilizer," IEEE Transactions on Consumer Electronics, November 1989, Vol. 35, No. 4. Although this system is apparently operable in the pitch and yaw directions, it is, however, not applicable to correct for disturbances in the roll direction. Furthermore, this system utilizes a method of altering the clocking sequence of the video data, thus making it necessary to have access to the timing signal of the detector. This, in effect, limits the ability to provide a remote camera.

What is needed then is a gimbal system which does not suffer the mechanical complexity and space requirements of the prior art gimbaling systems, and further, is operable in all three axes of pitch, roll and yaw. It is therefore an object of the present invention to provide such a gimbaling system.

SUMMARY OF THE INVENTION

This invention discloses an electronic gimbal system used either alone or in combination with a mechanical gimbal for image stabilization of consecutive video images from an imaging sensor system mounted on a platform subject to disturbances. More particularly, an inertial sensor is incorporated as part of the imaging system to provide an output signal of how much the platform has been disturbed relative to an inertial coordinate system such that the video input signal can be repositioned relative to the inertial coordinate system.

In one preferred embodiment, a digital signal representing pixel locations of an image as sensed by a sensor is applied to an input frame storage device. The storage device applies the digital signal as a two-dimensional array of the image to an address look-up calculator. The address look-up calculator provides a means for randomly addressing the storage location for each of the pixel locations. The address look-up calculator also receives a signal from an inertial sensor which continually determines the platforms position relative to the inertial coordinate system. The address look-up calculator adjusts each of the pixel locations of the two-dimensional input frame image from the input frame storage device according to the signal from the inertial sensor, and applies the altered image to an output frame storage device which outputs the digital video signal as a stabilized image. The address look-up calculator can either adjust the image from the input frame storage device a desirable number of offset pixels vertically and horizontally in order to realign the image, or it can apply an interpolation algorithm to average a weighted sum of pixels to derive the desirable stabilized output.

Additional objects, advantages, and features of the present invention will become apparent from the following description and appended claims, taken in conjunction with the accompanying drawings.

BRIEF DESCRIPTION OF THE DRAWINGS

FIG. 1 is a schematic block diagram of an electronic gimbal system according to one preferred embodiment of the present invention; and FIG. 2 is an image pixel representation aligned in a predetermined coordinate frame.

DETAILED DESCRIPTION OF THE PREFERRED EMBODIMENT

The following discussion of the preferred embodiments concerning an electronic gimbal system is merely exemplary in nature and is in no way intended to limit the invention or its application or uses.

Referring to FIG. 1, a schematic block diagram of an electronic gimbal system 10 according to one preferred embodiment is shown. In one application, the electronic gimbal system 10 could be part of a target seeking system incorporated on a missile or aircraft. An input digital video signal of a particular scene generally taken from an analog-to-digital converter (not shown), which receives an analog video signal from a imaging sensor (not shown), is applied to an input frame storage device 12. The input frame storage device 12 will store the digital video signal as a two-dimensional array of values, where each value represents the intensity of a pixel, or in the case of an infrared sensor the temperature of a pixel, of the image of the scene. Consequently, frames of video data are consecutively stored in the input frame storage device 12.

FIG. 2 gives a graphical representation of a few pixels of a frame of video data referenced to a particular x-y inertial coordinate system. Each square is a pixel location which will be represented by a value in the digital input data. Further, a number of the squares are labeled with a positional value relative to the coordinate axes addressable by a known processing device discussed below. The x axis and the y axis show two degrees of freedom, such as yaw and pitch directions. A third degree of freedom, such as a roll angle, is shown by rotating the x-y coordinate system at the intersection of the x axis and the y axis to form an x'-y' coordinate system.

An output signal from the input frame storage device 12 is applied to an address look-up calculator 14 which provides an address location for each pixel of the frames of video data. The address look-up calculator 14 can be any appropriate microprocessor or specialized integrated circuit which performs address calculations. A known applicable integrated circuit is manufactured by TRW and referred to as an image resequencing sampler, TMS 2301. Also applied to the address look-up calculator 14 is a frame offset signal from an inertial sensor 16, as shown. The inertial sensor 16 can be any applicable inertial sensor, such as a gyroscope, known to those skilled in the art. A gyroscope inertial sensor will generally include a spinning mass having appropriate detection circuitry for providing a signal indicative of the degree the mass is precessed by an external torque (as would be caused by platform vibration) relative to the spin axis of the mass. An output from the address look-up calculator 14 is applied to an output frame storage device 18 which stores consecutive frames of digital video output signals that are stabilized. An output from the output frame storage device 18 is then applied to subsequent image processing components as is known in the art. In one specific implementation of the electronic gimbal system 10, the output of the output frame storage device 18 could be applied to a target seeking system 20 for tracking a target, such as would be incorporated on a missile. Target seeking systems of the type that receive an output from a gimbaled sensor in order to track a target are well known to one skilled in the art.

In operation, the input frame storage device 12 applies the two-dimensional input digital video signal to the address look-up calculator 14 along with the offset signal from the inertial sensor 16 such that the measured inertial offset by the inertial sensor 16 is used to alter the different pixel locations in the video input signals to be aligned with a common inertial coordinate system. The input signal may have already been subject to mechanical stabilization. The address look-up calculator 14 has access to any of the pixel locations in a random manner. The address look-up calculator 14 uses a mathematical transformation algorithm to compute the pixel offset of the input signal such that the image data in the input frame storage device 12 is restored to an inertially stabilized position.

For example, suppose that the image in the input frame storage device 12 was sensed by the inertial sensor 16 to be displaced from the inertial reference (location (x,y) in the coordinate frame) by 2.6 pixels vertically up and 1.2 pixels horizontally right, as shown by the (a,b) data point of the pixel representation of FIG. 2. In its simplest transformation, the address look-up calculator 14 will provide an output image which is offset from the input image as stored in the input frame storage device 12 by subtracting three pixel locations in the vertical direction (2.6 rounded to the nearest integer) from the vertical address of each pixel location in the input signal and subtracting one in the horizontal direction (1.2 rounded to the nearest integer) from the horizontal address of each pixel location in the input signal. The address look-up calculator 14 will then apply this output to the output frame storage device 18. Consequently, the nearest pixel location for each sensed misaligned pixel location of the image is selected as the appropriate location. Since the sensed offset may not correspond to an exact pixel location (as indicated by this example), there may be some portions of the output frame storage device 18 in which no input image data exists since the input and output images do not perfectly overlap. Conversely, there will be some portion of the input frame storage device 12 which is not used.

Since the process of selecting the nearest pixel location introduces a small amount of image degradation because of the misalignment, an alternate strategy can be devised. In an alternate example, for each input pixel location a weighted sum of pixel values is calculated from a plurality of pixels proximate to the transformed pixel address in the input image. This technique is known in the art and is commonly referred to as "resampling." Generally resampling techniques use the four nearest pixel locations to the subject pixel location to provide a linear weighting.

The process of linear weighting can be accomplished by "bilinear interpolation." A typical known weighting equation used in bilinear interpolation can be set forth as:

$$P(x+a,y+b)=(1-a)(1-b)P(xy)+(1-a)bP(x,y+1)+a(1-b)P(x+1,y)+abP(x+1,y+1)$$

where x and y are the pixel location representations, a and b are the fractional parts of the spacial locations of the subject pixel in the x and y coordinates, and P is the pixel intensity representation. Once the inertial sensor 16 measures the platform offset, each pixel location from the input storage device 12 is subject to the transformation of the above weighting equation. The effect of this weighting process is to weigh the closer of the adjacent four pixels higher and the more distant of the adjacent four pixels lower in the summing process. For example, if the pixel is exactly centered in P(x,y), then a=b=0 and only P is used in the sum.

The above described electronic gimbal system can either be used singly or in combination with a mechanical gimbal system. FIG. 1 shows a mechanical gimbal system 22 which provides an input signal to the input frame storage device 12. This input from the mechanical gimbal system 22 will provide an adjusted signal of the actual scene in one or more of the degrees of freedom in a course adjustment manner. When used in combination with the mechanical gimbal system 22, the mechanical gimbal system 22 generally will provide a course adjustment and the electronic gimbal system 10 will provide a fine tuning adjustment. Gimbal structures which include multiple sets of gimbals in a single axis, typically utilize an inner gimbal structure and an outer gimbal structure where the inner gimbal structure provides the fine tuning adjustment for very high degrees of stabilization. In such a system, it is proposed to replace the inner mechanical gimbal structure with the electronic gimbal system as discussed above.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An electronic gimbal system for stabilizing consecutive images from a sensor, said gimbal system comprising:
   means for providing an input signal of a desirable scene;
   inertial sensor means for measuring an offset of the sensor relative to an inertial coordinate system;
   address look-up calculator means for receiving an offset signal from the inertial sensor means and aligning the input signal to the inertial coordinate system, said address look-up calculator means assigning address locations for the input signal and adjusting the address locations in accordance with the offset signal to correspond to the inertial coordinate system; and
   an input frame storage means for receiving the input signal and storing it as a two-dimensional array of pixel locations where each pixel location has a value, said input frame storage means being operable to output the array of pixel values to the address look-up calculator means.

2. The electronic gimbal system according to claim 1 further comprising an output frame storage means for storing a stabilized array of pixel locations which has been output by the address look-up calculator means.

3. The electronic gimbal system according to claim 1 wherein the inertial sensor means is a gyroscope, said gyroscope providing the offset signal indicative of a disturbance force on the sensor.

4. The electronic gimbal system according to claim 1 wherein the address lock-up calculator means receives the array of pixel locations and the offset signal and aligns the pixel locations in the inertial coordinate system, said address look-up calculator means operable to randomly address the pixel locations in the array in order to adjust the pixel values of the pixel locations to conform to the inertial coordinate system.

5. The electronic gimbal system according to claim 1 wherein the address look-up calculator means uses bilinear interpolation for selectively weighting predetermined pixel locations for each of the pixel locations in the array and providing a weighted sum of pixel values for each pixel location.

6. The electronic gimbal system according to claim 5 wherein the address look-up calculator means selectively weights the closer of adjacent pixels higher than the more distant of adjacent pixels for each pixel location depending on the amount of measured offset relative to stabilized pixel locations in the inertial coordinate system.

7. An electronic gimbal system for stabilizing consecutive images from a sensor, said gimbal system comprising;
   means for providing an input signal of a desirable scene, said input signal including representations of pixel locations of the scene where each pixel location has a value;
   inertial sensor means for measuring an offset of the sensor relative to an inertial coordinate system in three degrees of freedom;
   an address look-up calculator operable to align the pixel locations in the inertial coordinate system in each of the degrees of freedom to the inertial coordinate system, said address look-up calculator receiving the input signal from the means for providing an input signal and an offset signal from the inertial sensor means and being operable to randomly access each of the pixel locations in the input signal in order to adjust the address locations to the inertial coordinate system; and
   an input frame storage means for receiving the input signal and storing it as a two-dimensional array of pixel locations, said input frame storage means operable to output the array of pixel values to the transformation means.

8. The electronic gimbal system according to claim 7 further comprising an output frame storage means for storing a stabilized array of pixel locations which has been output by the address look-up calculator.

9. The electronic gimbal system according to claim 7 wherein the inertial sensor means is a gyroscope, said gyroscope providing the offset signal indicative of a disturbance force on the sensor.

10. The electronic gimbal system according to claim 7 wherein the address look-up calculator uses bilinear interpolation for selectively weighting predetermined pixel locations for each addressable pixel location and for providing a weighted sum of pixel values as the value of the addressable pixel location.

11. The electronic gimbal system according to claim 10 wherein the address look-up calculator selectively weights the closer of adjacent pixels higher than the more distant of adjacent pixels for each pixel location depending on the amount of measured offset relative to stabilized pixel locations in the inertial coordinate system.

12. A method of stabilizing a series of images from a sensor, said method comprising the steps of:
   providing a pixel representation of an input signal of a desirable scene, wherein each pixel representation has a value;
   measuring an offset of the sensor relative to an inertial coordinate system in at least one degree of freedom;
   transforming the pixel representation of the input signal to be aligned with the inertial coordinate system by adjusting each pixel value an amount determined by the measured offset, wherein the step of transforming includes the steps of determining an address location for each of the pixel locations, determining the measured offset of the sensor and adjusting each pixel address location to be aligned with the inertial coordinate system; and further comprising the steps of applying the input signal to an input frame storage device for storing the input signal as a two-dimensional array of pixel locations, and outputting the two-dimensional array of pixel locations to an address look-up calculator.

13. The method according to claim 12 further comprising the step of applying a transformed signal to an output frame storage device for storing an aligned frame of pixel locations.

14. The method according to claim 12 wherein the step of measuring the offset of the sensor includes the step of measuring the offset of the sensor by a gyroscope, said gyroscope providing an offset signal indicative of a disturbance force on the sensor.

15. The method according to claim 12 wherein the step of transforming the input signal includes applying the input signal to an address look-up calculator for randomly addressing the locations of the pixel representations of the input signal.

16. The method according to claim 12 wherein the step of transforming the input signal includes the step of applying a bilinear interpolation to the input signal for providing a weighted sum of pixel values for each pixel location.

17. The method according to claim 16 wherein the step of applying a bilinear interpolation includes selectively weighting the closer of the adjacent pixels higher than the more distant of the adjacent pixels depending on the amount of measured offset relative to stabilized pixel locations in the inertial coordinate system.

* * * * *